United States Patent [19]
Hunter

[11] 3,826,517
[45] July 30, 1974

[54] COUPLING DEVICE

[75] Inventor: George Dwight Hunter, Des Moines, Iowa

[73] Assignee: Deere & Company, Moline, Ill.

[22] Filed: Feb. 16, 1973

[21] Appl. No.: 333,316

[52] U.S. Cl. ............. 280/511, 280/479 A, 280/504
[51] Int. Cl. .......................... B60d 1/06, B60d 1/12
[58] Field of Search ....... 280/504, 511, 432, 479 A, 280/513

[56] References Cited
UNITED STATES PATENTS

| | | | |
|---|---|---|---|
| 2,453,139 | 11/1948 | Kleinkort | 280/504 |
| 2,850,292 | 9/1958 | Holland | 280/432 |
| 3,479,057 | 11/1969 | Miller | 280/511 |
| 3,677,564 | 7/1972 | Kothman | 280/511 |
| 3,715,133 | 2/1973 | Schafer | 280/479 A |

*Primary Examiner*—Leo Friaglia

[57] ABSTRACT

A power operated coupling device includes a ball hitch mounted on the drawbar of a tractor and a ball hitch-engaging member mounted on the tongue of an implement. A keeper which is hydraulically remotely controlled between latching and unlatching positions, confines the tongue of the implement to movement about the ball. The draft links of the tractor carry a pick-up bale which engages a pick-up hook on the tongue of the implement to either raise or lower the tongue into engagement with or disengagement from the ball hitch.

5 Claims, 6 Drawing Figures

3,826,517

3,826,517

COUPLING DEVICE

CROSS REFERENCE TO RELATED APPLICATION

This application contains common subject matter as that disclosed in U.S. application, Ser. No. 333,315, John William Ackley inventor, and entitled, "COUPLING DEVICE."

BACKGROUND OF THE INVENTION

This invention relates to coupling devices and more particularly to a remotely actuatable coupling device for attaching an implement tongue to the drawbar of a tractor.

There are presently known ways of connecting an agricultural implement to the drawbar of a tractor without requiring the operator to demount from the tractor. Generally, these presently known teachings comprise an elongated pick-up rod which is manually manipulated by the tractor operator from his seat. Normally, the rod has a hook on the lower end and the operator engages the tongue of the implement with the hook to raise the tongue onto the drawbar. A retaining means, sometimes the rod itself, is then inserted in a clevis-type hitch to secure the implement to the tractor. While these manual rod-type coupling devices work adequately when the implement to be hitched is generally small and lightweight, they are unsatisfactory when large implements such as being used today are to be coupled to the tractor. It will be appreciated that the tongues of these large implements are quite heavy and do not lend themselves to being manually raised.

SUMMARY OF THE INVENTION

It is therefore an object of this invention to present an improved coupling device for remotely connecting the tongue of an implement to the drawbar of a tractor.

It is another object of this invention to present a coupling device which utilizes the draft links of a tractor to raise or lower the implement onto or from the drawbar of the tractor.

A further object of this invention is to present a coupling device for connecting an implement to a tractor which uses power operable means for locking the implement to the drawbar of the tractor.

An additional object of this invention is to present a coupling device for connecting the tongue of an implement to the drawbar of a tractor having the capability of accommodating different type tongue connectors.

Generally, the above stated objects are accomplished by means of a coupling device having a ball hitch connected to the drawbar of the tractor and a ball-engaging member connected to the tongue of the implement. Also affixed to the tongue is a pick-up hook which receives a pick-up bale suspended from and between the conventional draft links of the tractor to enable the tractor operator to urge the ball engagement onto or disengagement from the ball hitch by manipulation of the draft links. The ball engagement member is releasably confined to movement about the ball by means of a keeper hydraulically actuatable between latching and unlatching positions from the operator's station of the tractor.

BRIEF DESCRIPTION OF THE DRAWINGS

Other objects and advantages of the invention will become apparent upon reading the following detailed description and upon reference to the drawings, in which.

DESCRIPTION OF THE PREFERRED EMBODIMENT

Before entering into the preferred embodiments, it is to be understood that the invention is not limited in its application to the details of construction and arrangement of parts illustrated in the accompanying drawings, since the invention is capable of other embodiments and being practiced and carried out in various ways. Also, it is to be understood that the phraseology or terminology employed herein is solely for the purpose of description and is not to be construed as words of limitation.

Figure 1:
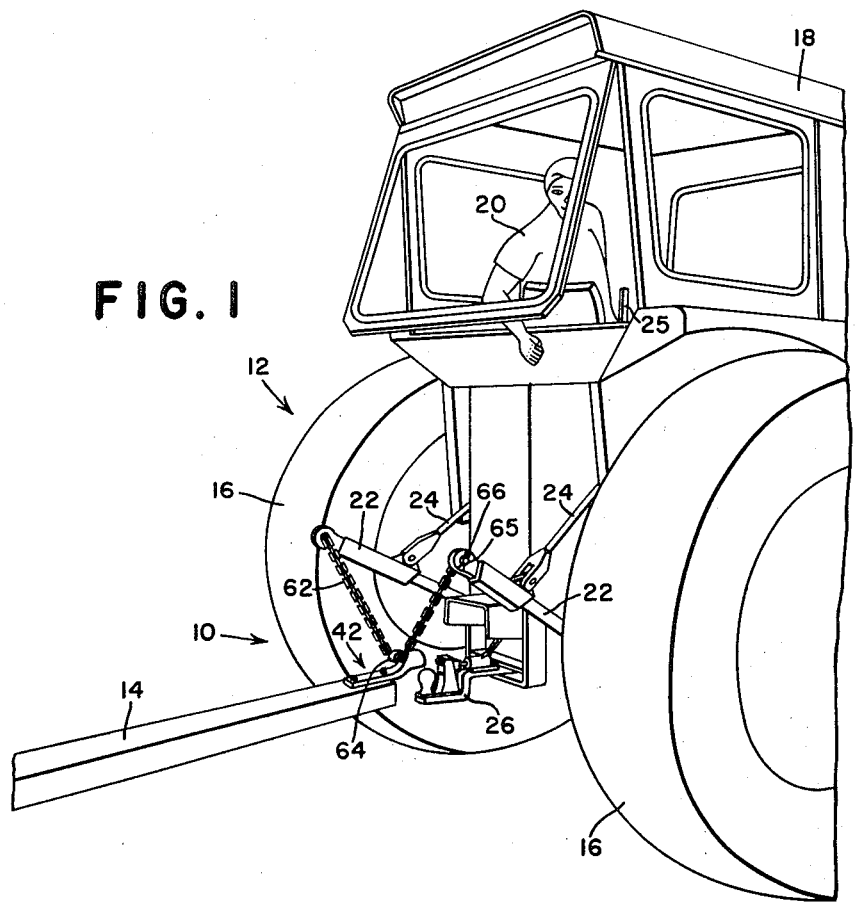
FIG. 1 is a perspective view of the rear portion of a tractor and the forward portion of an implement tongue showing the coupling device of this invention.

Turning now to FIG. 1 of the drawings, the components of the coupling device 10 of this invention are shown in working cooperation on the rear of a tractor 12 and the tongue 14 of an implement (not shown). The tractor 12 has rear wheels 16 and an enclosed cab 18 in which an operator 20 is seated in the operator's station. The tractor has the conventional draft links 22 which are hydraulically pivotal about a horizontal axis through lift links 24, pivotation being achieved by the operator 20 manipulating a conventional control lever 25 located in the operator's station. Extending rearwardly from the rear of the tractor is a drawbar 26 normally having an offset portion to which the tongue 14 is releasably attached by coupling device 10 for connecting the implement to the tractor, and through which the pulling force of the tractor is transmitted to the implement tongue 14.

Figure 2:
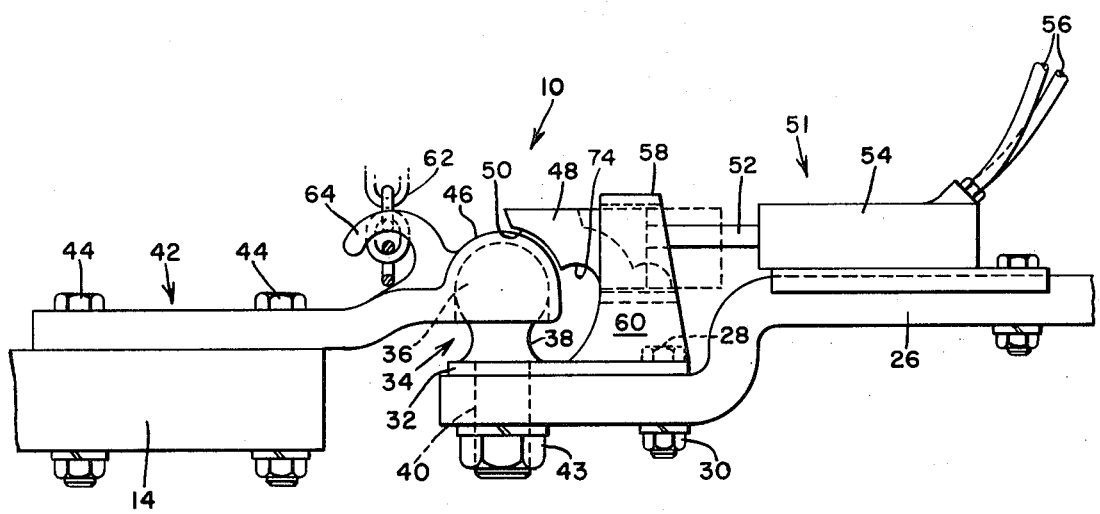
FIG. 2 is a side view of the coupling device of this invention.

Turning now to FIG. 2, the coupling device of this invention includes tractor mounted components and tongue mounted components which cooperate to effect the coupling of the implement to the tractor. It is to be understood that the implement to be connected in no way limits the application of the coupling device, and such may be a plow, a disk harrow, or any other farm implement. Rigidly secured to the rear offset portion of drawbar 26, by appropriate means such as a bolt 28 and a nut 30 threadedly received on the bolt, is a substantially flat base plate 32. A ball hitch 34 having a head 36 and a reduced diametered neck 38 is secured to the rearward portion of base plate 32 by means of a threaded shank 40 extending downwardly from neck 38 through aligned apertures in the base plate and the drawbar 26 and a nut 43 threadedly received on the threaded shank 40 beneath the drawbar.

A ball-engaging member 42 fastened to the forward end of tongue 14 through the cooperation of nut and bolt fastening means 44 includes (forwardly of the outer end of tongue 14) a cup-shaped socket 46 adapted for riding engagement on the head 36 of the ball hitch 34 when the implement is coupled to the drawbar. Obviously the riding of socket 46 on the ball hitch affords limited movement of tongue 14 in all directions. A keeper 48, horizontally movable between an extended latching position and a retracted unlatching position and incorporating a first facing surface 50 shaped to conform to the outer contour of socket 46, is provided for confining the ball engagement member 42 to movement about the head 36 of ball hitch 34. Keeper 48 is operated by a power means 51 which may be a piston 52 carrying on one end the keeper 48 and reciprocally received within a double-acting hydraulic cylinder 54 which is appropriately secured to drawbar 26 forwardly of ball hitch 34. Reciprocation of piston 52 is operably controlled by operator 20 through the use of control lever 25 located within cab 18 and fluidly communicating with cylinder 54 over conduits 56.

As can be visualized from FIG. 2, when the keeper is in the unlatched position, that is, when the piston 52 has been retracted as is shown dotted, the ball engagement member 42 can be removed from ball hitch 34. However, when the keeper is in the latching position, that is, when the piston is extended the ball hitch cannot become decoupled from the ball hitch. A guide member 58 having legs 60 secured to base plate 32 closely surrounds keeper 48 and serves as bracing to enable the keeper to withstand any lateral or upward forces exerted on the keeper by the ball hitch.

Returning now to FIG. 1, a pick-up bale 62 shown in the form of a flexible chain is suspended from and drooped between draft links 22 and a pick-up hook 64 is provided on the upper surface of ball engagement member 42. Pick-up hook 64 has an opening sufficient to accept pick-up bale 62 and, consequently, the operator 20 from inside cab 18 by manipulation of the draft links can raise or lower tongue 14. Pick-up bale 62 may be suspended by one of several methods, such as by means of a pin 65 which has an eyelet on one end for receiving the chain and which passes through a transverse aperture in the end of the draft links. A cotter 66 may be used to retain the pin 65 in the aperture of the draft links.

Figure 3:
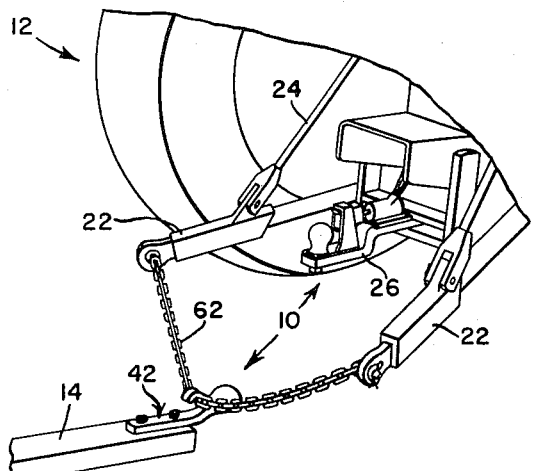
FIGS. 3, 4 and 5 show sequential steps in the coupling of the implement tongue to the tractor drawbar.
Figure 4:
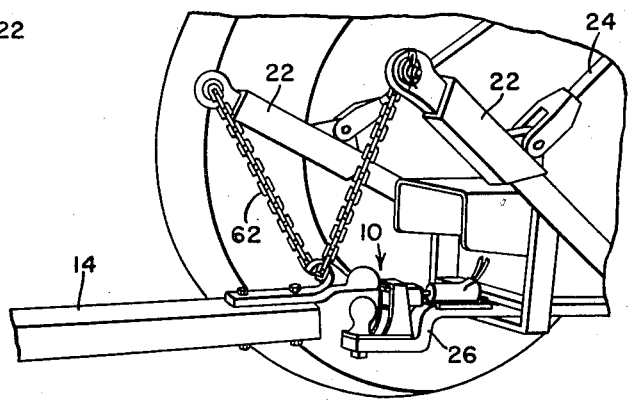
Figure 5:
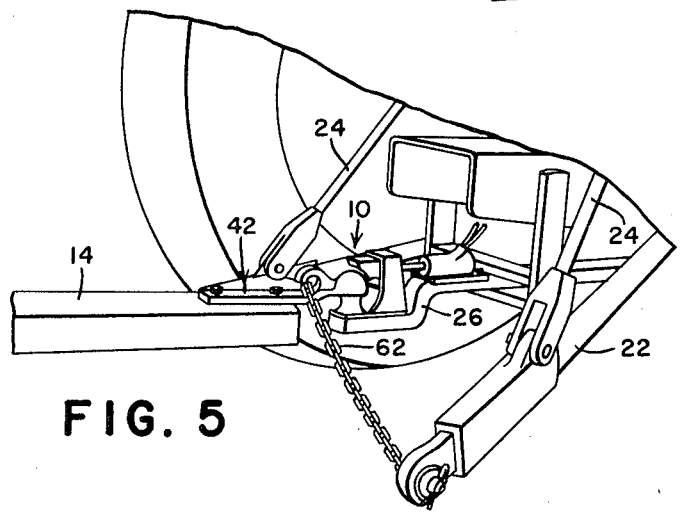

Turning now to FIGS. 3, 4 and 5 of the drawings, the coupling of the tongue to the drawbar is easily seen. In FIG. 3, initially, the operator backs the tractor 12 toward the implement tongue 14 and moves the keeper cylinder control lever to the retracted position which establishes the keeper in the unlatching position. It may be necessary at times to jockey the tractor back and forth slightly in order to slip the pick-up bale into the hook. Moving now to FIG. 4, the operator lifts tongue 14 by raising draft links 22 until the socket 46 is slightly higher than ball hitch 34. Then, either by backing the tractor or by pulling the implement tongue 14 forwardly by further lifting of the draft links, the operator positions socket 46 directly above and in line with ball hitch 34. Turning now to FIG. 5, the draft links 22 are lowered to permit the socket 46 to slip on to ride on ball hitch 34. The operator next extends piston 52 to move the keeper 48 into the latch position. The implement is now coupled to the tractor. In order to disconnect the tongue from the tractor, the above mentioned steps are reversed; that is, the keeper is moved to the unlatching position and the draft links are then raised to lift the ball engagement member from ball hitch 34 and then the tractor is moved slightly forwardly and the tongue is lowered to the ground by lowering of the draft links.

Figure 6:
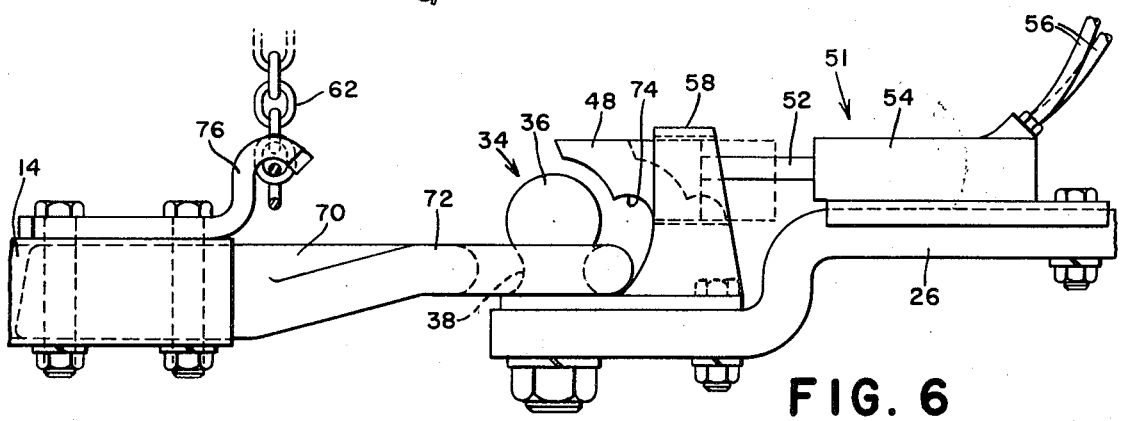
FIG. 6 is a side view of the coupling device of this invention showing an implement tongue having a second type of ball engagement means, an element of the invention.

Turning now to FIG. 6 of the drawings, the coupling device of this invention is shown utilizing a ring-type ball engagement member 70 rather than the socket-type as previously discussed. The working cooperation of the ball hitch 34, the keeper 48, the piston 52 and the cylinder 54, as well as guide member 58, are the same as shown previously. The ring-type ball engagement member 70 comprises a horizontal ring 72 which, when coupled to the ball hitch 34, normally bears against the neck 38 of ball hitch 34 and during the coupling, slips over the head 36 of the ball hitch. Keeper 48 includes a second facing surface 74 which conforms to the cross sectional curvature of ring 72. Ring-type ball engagement member 70 is shown connected to tongue 14 by having the rearward portion of the ball engagement member inserted into the tubular bore of the tongue and fastened by suitable bolts and nuts. However, it is to be understood that the fastening of the ball engagement member to the tongue is in no way limited, and either the socket-type or the ring-type ball engagement member can be secured thereto in a variety of ways. Also, in this Figure, a second type of pick-up hook 76 is shown. However, here again, it in no way limits the application of this device. The coupling and decoupling of a ring-type ball engagement member is identical to the procedure discussed with the ball-socket arrangement, and reference is hereby made to the discussion on the ball-socket hitch engagement member for an understanding of the coupling and decoupling procedure.

Thus it is apparent that there has been provided, in accordance with the invention, a coupling device that fully satisfies the objects, aims and advantages set forth above. While the invention has been described in conjunction with specific embodiments thereof, it is evident that many alternatives, modifications and variations will be apparent to those skilled in the art in light of the foregoing description. It is to be noted that the coupling device of this invention can accommodate both a socket-type ball engagement member and a ring-type ball engagement member without requiring any modification or alteration, thus eliminating the need for two different tractors, one having a hitch to accommodate a ball-socket ball engagement member and the other having a hitch accommodating a ring-type ball engagement member, and hence greatly increasing the usefulness of a single tractor. It is the intent of the inventor to embrace all alternatives, modifications, and variations of the invention as fall within the spirit and broad scope of the appended claims.

I claim:

1. An apparatus for releasably coupling the tongue of a trailing vehicle to a leading vehicle comprising:
   a. a hitch ball mounted on said leading vehicle;
   b. a ball engagement member affixed to said trailing vehicle and engageable with said ball hitch for coupling the trailing vehicle to the leading vehicle;
   c. a keeper carried by said leading vehicle and movable between latching and unlatching positions; said keeper in the latching position when the ball-engaging member is engaged with the hitch ball confining the movement of the ball engagement member and preventing disengagement thereof from the hitch ball;

d. power means for selectively moving said keeper between the latching and unlatching positions and retaining said keeper in the selected position; and e. a guide member secured to said leading vehicle and surrounding said keeper in order to brace the keeper against forces induced on the keeper by the ball engagement member during operation.

2. An apparatus as in claim 1 wherein said power means is hydraulically operable.

3. An apparatus as in claim 1 wherein said keeper has a surface area facing said ball hitch; said surface area having an arcuate shape substantially the same contour as the outer surface of said ball engagement member.

4. An apparatus for coupling the tongue of an implement to the drawbar of a tractor comprising:
  a. a hitch ball mounted on and extending upwardly from said drawbar;
  b. a ball engagement member affixed to the tongue of said implement and engageable with said hitch ball to couple the implement to the tractor;
  c. a hydraulic cylinder operable from the operator's station of the tractor and carrying a piston reciprocable between extended and withdrawn positions;
  d. a keeper carried on the end of said piston and movable between a latching position when the piston is extended and an unlatching position when the piston is retracted; said keeper in the latching position when the ball hitch engagement member is engaged with the ball hitch inhibiting the disengagement of the ball hitch engagement means;
  e. a guide member secured to the tractor and surrounding said keeper in order to brace the keeper against forces induced on the keeper by the ball hitch engagement member; and
  f. means for urging the ball engagement member into engagement and disengagement from the ball hitch.

5. An apparatus as in claim 4 wherein said tractor has draft links pivotal about a vertical axis and wherein said means for urging the ball engagement member into engagement with the hitch ball comprises:
  a. a pick-up bale suspended between and drooped from said draft links; and
  b. a pick-up hook affixed to the tongue of said implement; said pick-up bale being receivable in said hook to enable the tongue to be urged onto the ball engagement member by manipulation of the tractor draft links and jockeying of the tractor.

* * * * *